United States Patent
Willett (10) Patent No.: US 7,128,555 B2
(45) Date of Patent: Oct. 31, 2006

(54) DOUGH MOULDER

(75) Inventor: Paul Eaton Willett, Narangba (AU)

(73) Assignee: Moffat Pty Ltd, Mulgrave (AU)

( * ) Notice: Subject to any disclaimer, the term of this patent is extended or adjusted under 35 U.S.C. 154(b) by 44 days.

(21) Appl. No.: 10/497,790

(22) PCT Filed: Sep. 25, 2003

(86) PCT No.: PCT/AU03/01268

§ 371 (c)(1),
(2), (4) Date: Mar. 24, 2005

(87) PCT Pub. No.: WO2004/030460

PCT Pub. Date: Apr. 15, 2004

(65) Prior Publication Data

US 2005/0170030 A1 Aug. 4, 2005

(30) Foreign Application Priority Data

Oct. 4, 2002 (GB) ................... 0223041.5

(51) Int. Cl.
*A21C 3/06* (2006.01)
*A21C 7/01* (2006.01)
(52) U.S. Cl. ............. 425/193; 425/320; 425/335; 425/364 R
(58) Field of Classification Search ........ 425/193, 425/320, 321, 335, 364 R; 99/450.1
See application file for complete search history.

(56) References Cited

U.S. PATENT DOCUMENTS

| | | | | | |
|---|---|---|---|---|---|
| 795,581 | A | * | 7/1905 | Corby et al. | 425/372 |
| 2,759,435 | A | * | 8/1956 | Krawczak | 425/364 R |
| 2,829,606 | A | * | 4/1958 | Dielentheis | 425/364 R |
| 2,856,869 | A | * | 10/1958 | Erikson et al. | 425/320 |
| 2,859,712 | A | * | 11/1958 | Kissinger | 425/335 |
| 3,121,406 | A | * | 2/1964 | Kieffaber | 425/371 |
| 3,167,032 | A | * | 1/1965 | Rhodes | 425/364 R |
| 4,966,071 | A | * | 10/1990 | Willett | 99/450.1 |
| 4,971,545 | A | * | 11/1990 | Willet | 425/321 |
| 4,976,600 | A | * | 12/1990 | Willett | 425/321 |
| 5,330,344 | A | * | 7/1994 | Konig | 425/321 |
| 6,361,307 | B1 | * | 3/2002 | Bernhard et al. | 425/321 |

FOREIGN PATENT DOCUMENTS

| | | |
|---|---|---|
| AU | 27667/84 B | 9/1984 |
| AU | 49250/85 A | 5/1986 |
| GB | 2219963 A | 12/1989 |

* cited by examiner

*Primary Examiner*—James P. Mackey
(74) *Attorney, Agent, or Firm*—Christensen O'Connor Johnson Kindness PLLC (57) ABSTRACT

A dough moulder for producing moulded dough products of a desired size and/or shape. The moulder includes guide plate (155, 156) which are selectively insertable through respective pairs of slots (151, 152, 153) formed in a pressure rolling board (150). The guide plates (155, 156) extend through the pressure rolling board (150) to define a channel of selectable width depending on which pair of slots (151, 152, 153) is selected. The variable width channel enables dough products of a desired size and/or shape to be rolled.

18 Claims, 7 Drawing Sheets

PRIOR ART

FIG. 1

PRIOR ART

FIG. 2

PRIOR ART

DOUGH MOULDER

BACKGROUND OF THE INVENTION

1. Field of the Invention

This invention relates to a dough moulder.

In particular, the invention relates to a dough moulder which is particularly suitable for, but not limited to, moulding dough of different volumes/weights to suit a range of bread and/or breadstick sizes.

2. Prior Art

Bread moulders are conventionally used to receive a piece of pre-weighed dough and mould it to a desired shape for a specific bakery product, before the dough is "proved" and then baked.

Small retail bakeries, or the bakery departments in supermarkets, may wish to produce a range of bread loaf sizes, together with stick-products, which are sold to the public.

Conventional dough moulders are not readily adjustable to enable moulding of the different dough piece sizes. For an example, a moulder manufactured by "Mono" (Trade Mark), which is arranged to be able to mould the dough for three different loaf sizes, has respective moulding sections for each loaf size, and gate means operable to selectively direct the dough pieces to the appropriate moulding section. A separate dough moulder is required to mould the dough for stick-type bakery products e.g., French sticks.

While it is known to have adjustable side plates on the inlet mouth to the moulding rollers to accommodate different size dough pieces, there is a tendency for pieces of the dough to form "strips" at the ends of the moulded dough pieces which result in an unattractive appearance.

SUMMARY OF THE PRESENT INVENTION

It is desirable to provide a dough moulder which is easily adjustable to mould dough pieces into a range of sizes and/or shapes.

It is advantageous to provide such a dough moulder which is simple to operate; and is relatively inexpensive to manufacture and maintain.

In a broad aspect, the present invention resides in a dough moulder of the type having at least one pair of inlet rollers; a dough conveyor operable to receive a strip of dough which has passed through the rollers, the conveyor having a first run operable to co-operate with a curling chain belt to curl or roll the dough strip into a dough piece and a second run operable with a pressure rolling board to mould the dough piece to a selected size and/or shape, wherein the dough moulder includes guide plates insertable through slots in the pressure rolling board into a gap between the second run and pressure rolling board to define a channel for limiting the length of the moulded dough piece.

When located in situ, the guide plates preferably define a channel that extends substantially parallel to the second run of the conveyor.

The guide plates may be insertable through slots in the pressure rolling board into the gap to locate said guide plates and, thereby, define said channel.

Preferably the pressure rolling board has a non-stick surface e.g., of PTFE, or other suitable material.

Preferably an inlet mouth, which directs the divided dough to the inlet rollers, has a pair of moving side plates operable to vary the effective width of the dough inlet to the rollers.

The inlet may include limiting means that selectively controls the width of a dough piece fed to the dough moulder. In the preferred embodiment, the channel means is operably linked to the limiting means such that selective width adjustment of the channel also adjusts the limiting means to feed dough pieces concomitantly adjusted in length.

BRIEF DESCRIPTION OF THE DRAWINGS

To enable the invention to be fully understood, a preferred embodiment will now be described, by way of example only, with reference to the accompanying drawings in which.

DESCRIPTION OF THE PREFERRED EMBODIMENT

Figure 1:
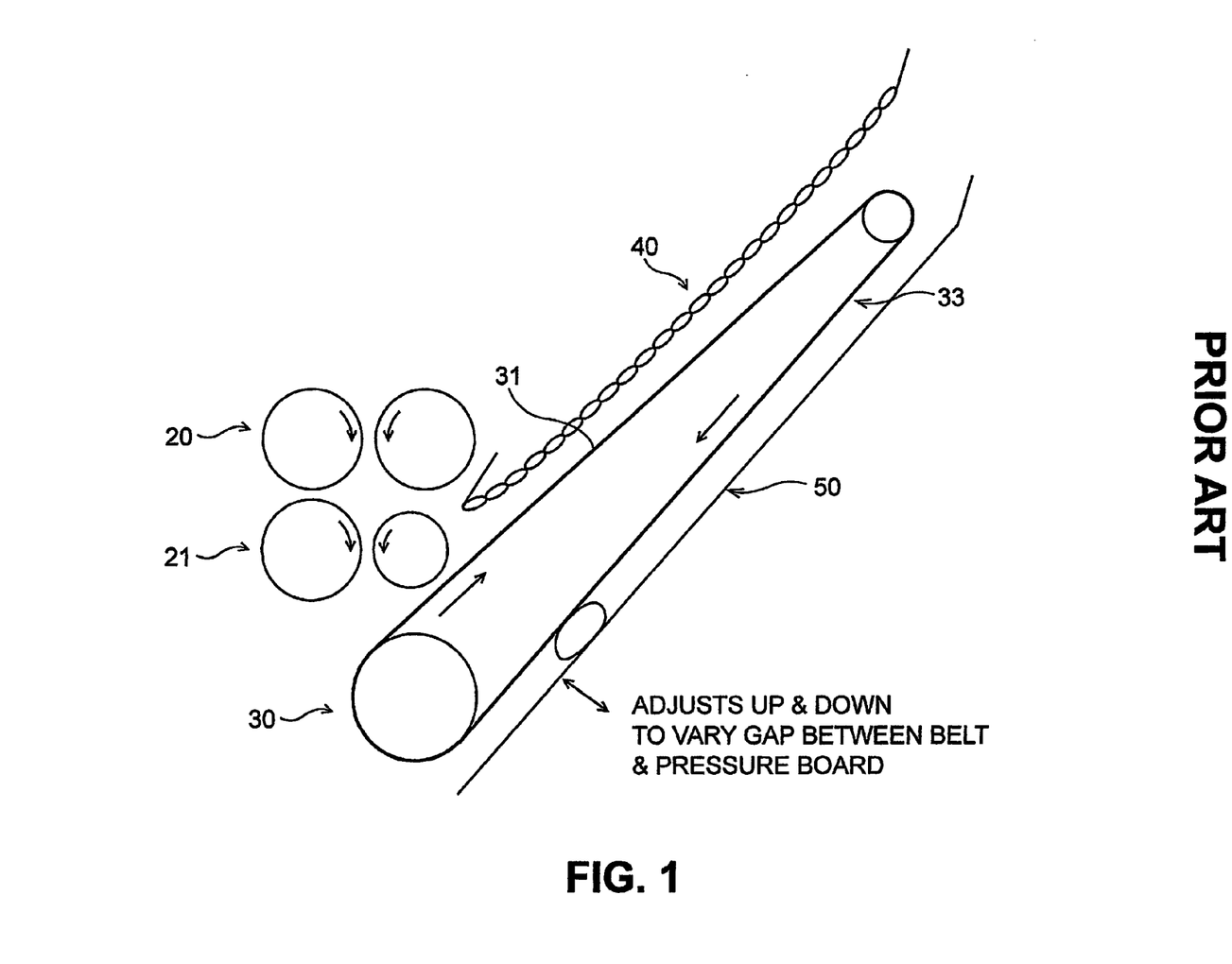
FIG. 1 is a schematic side view of a Prior Art dough moulder.
Figure 2:
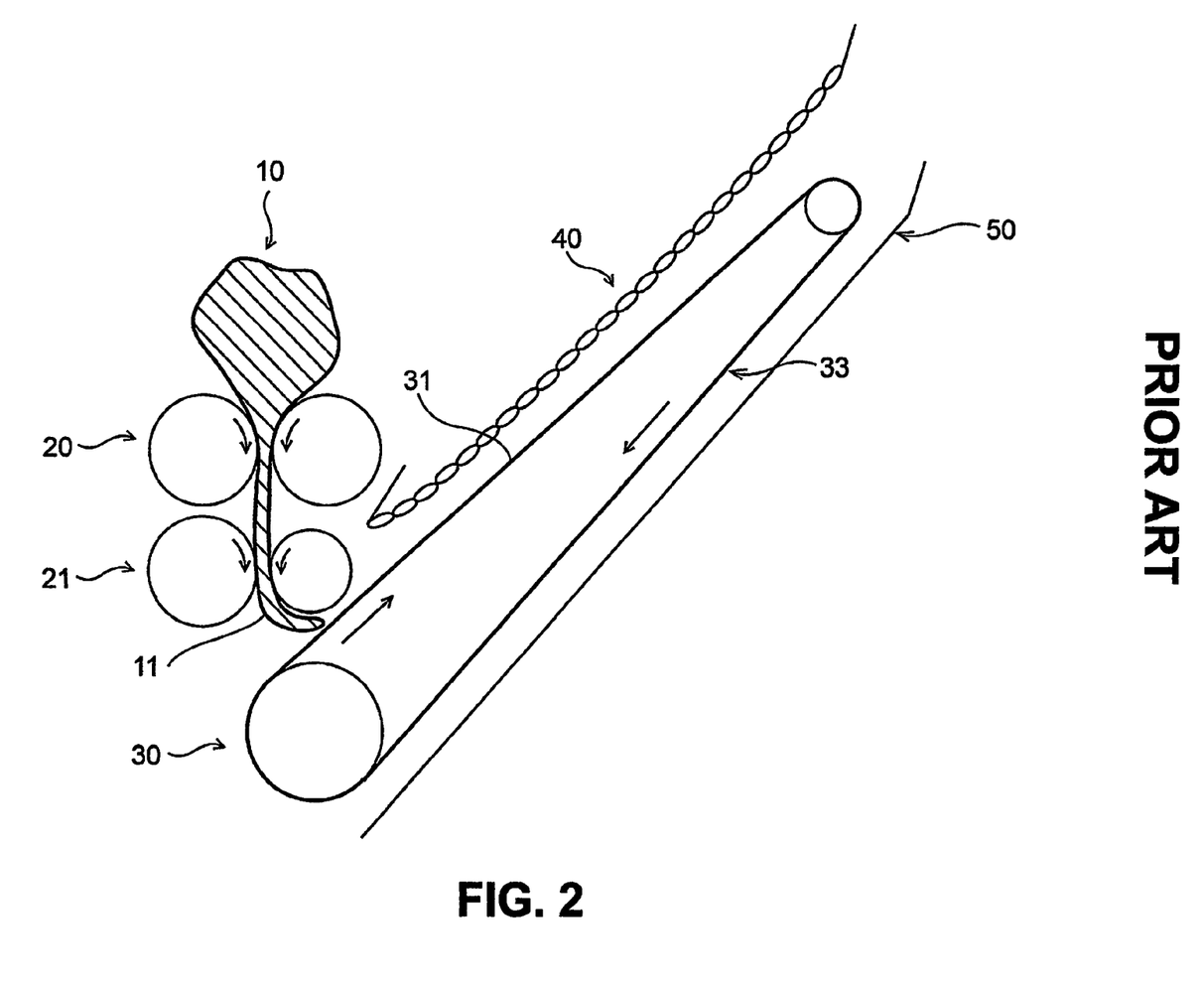
FIG. 2 is a schematic side view, corresponding to FIG. 1, showing a piece of the divided dough being fed by the dough rollers to the dough conveyor.
Figure 3:
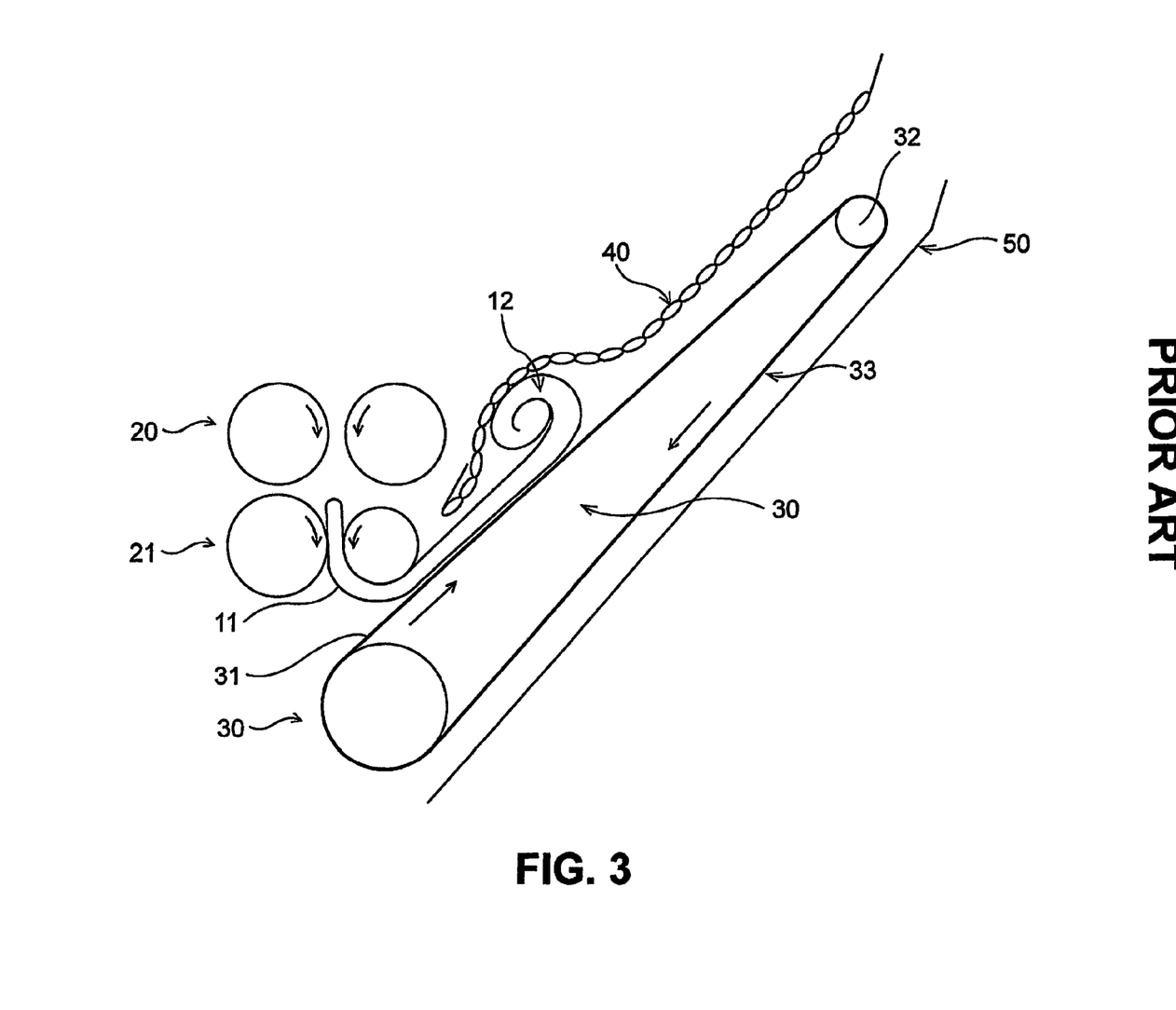
FIG. 3 is a similar view showing the curling of the dough piece by co-operation between the first run of the dough conveyor and the curling belt chain.
Figure 4:
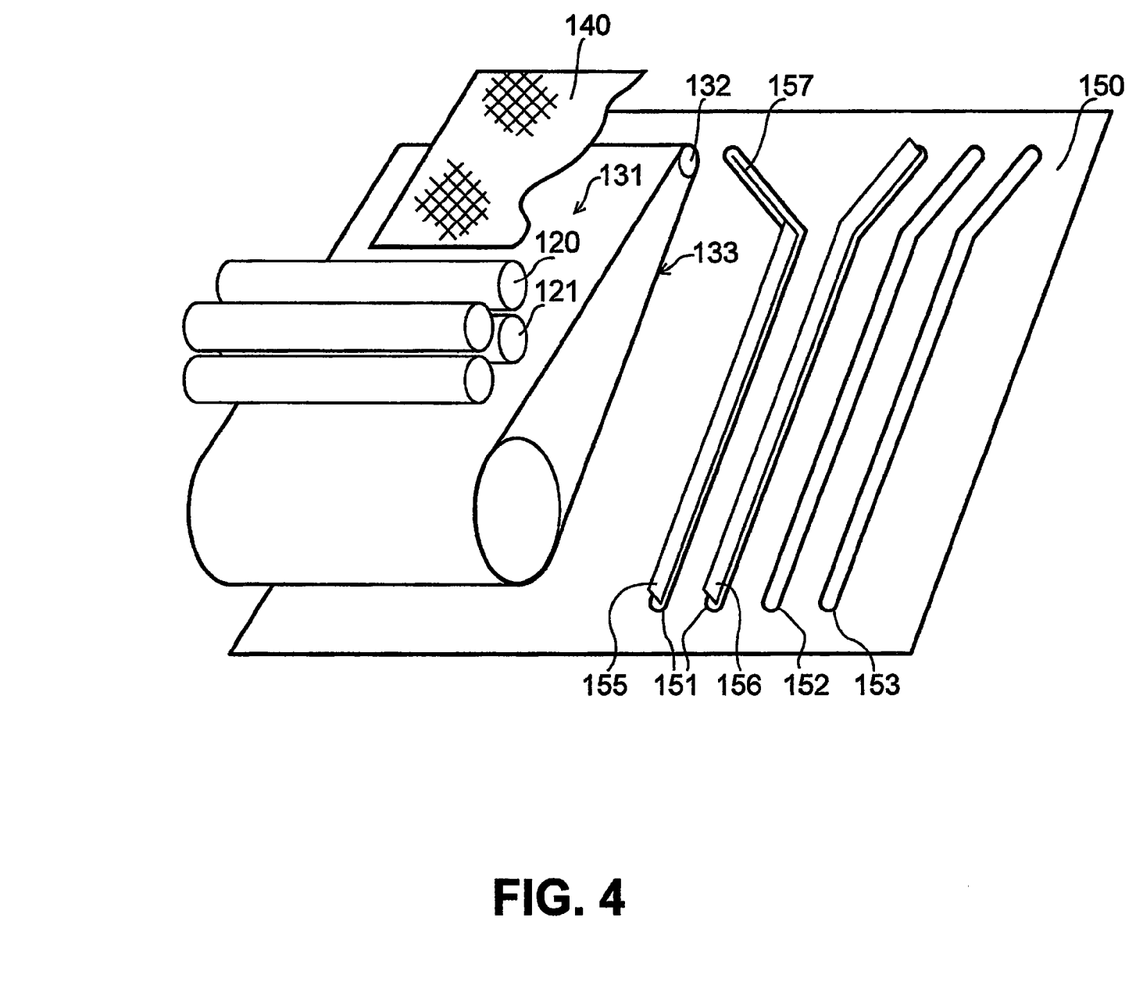
FIG. 4 is a cut away isometric view of a dough moulder of the present invention in a preferred embodiment without the inlet and with only one dough guide plate located.
Figure 5:
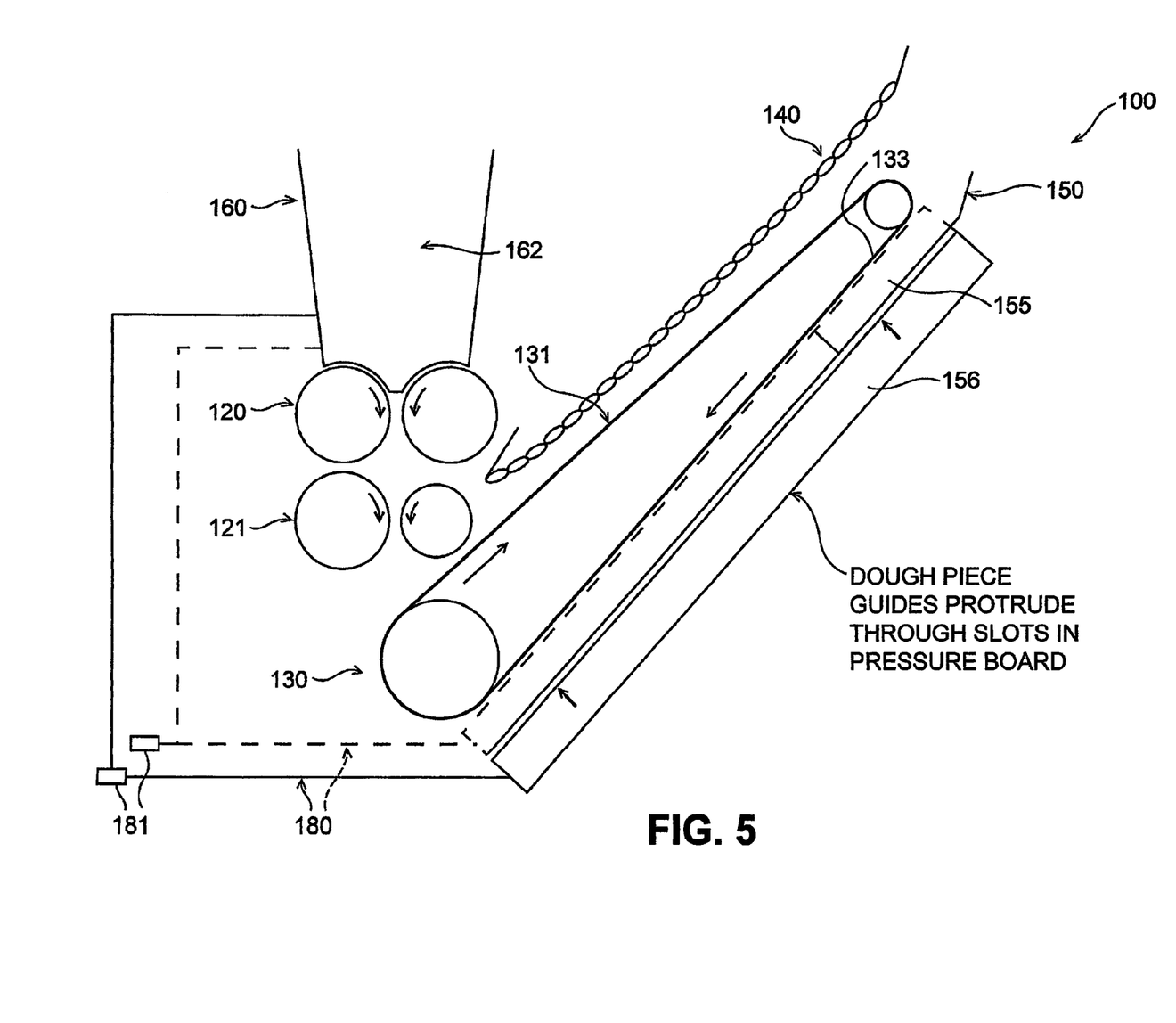
FIG. 5 is a schematic side view of the dough moulder in FIG. 4.
Figure 6:
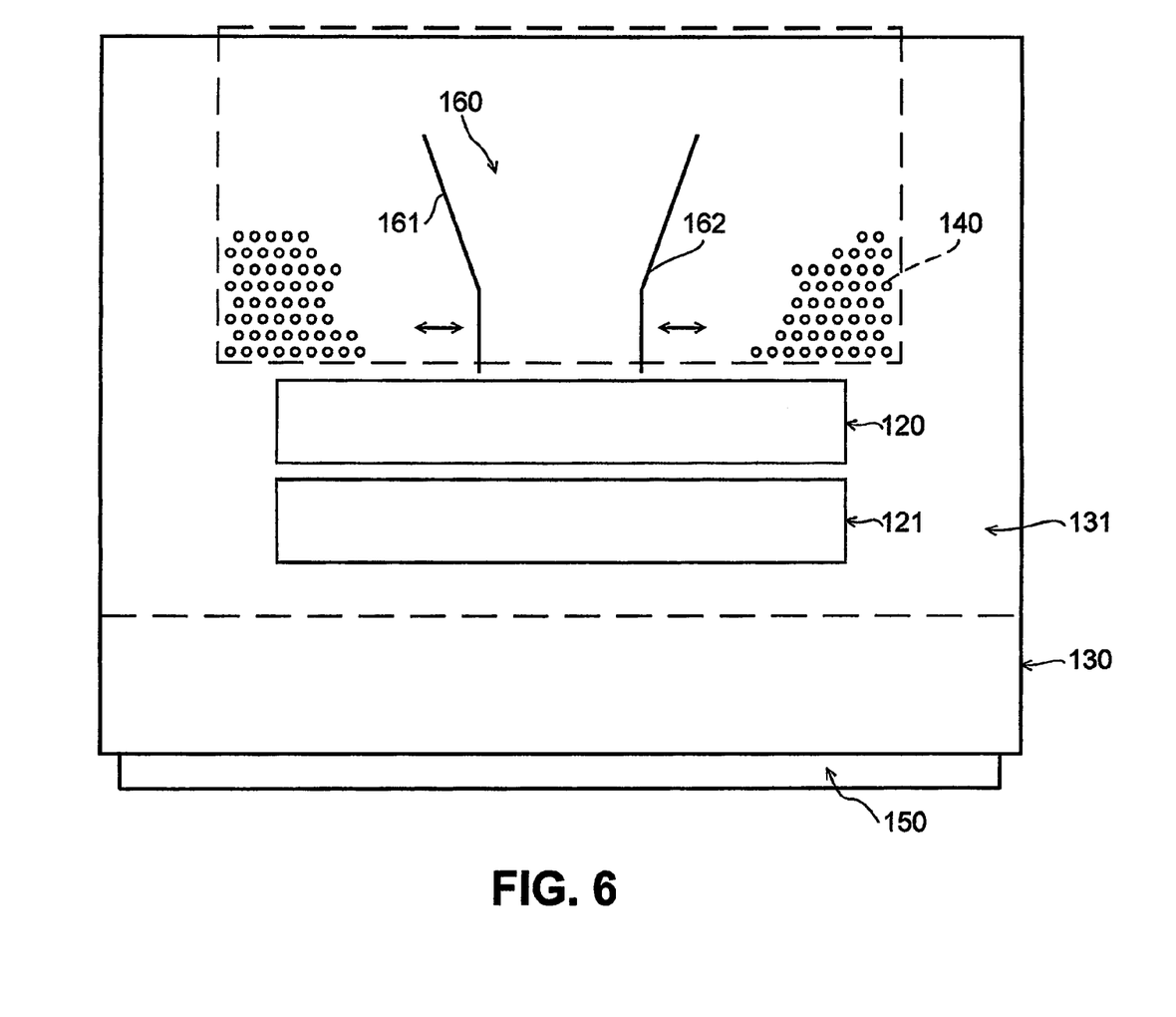
FIG. 6 is a schematic front elevational view of the dough moulder of the present invention.
Figure 7:
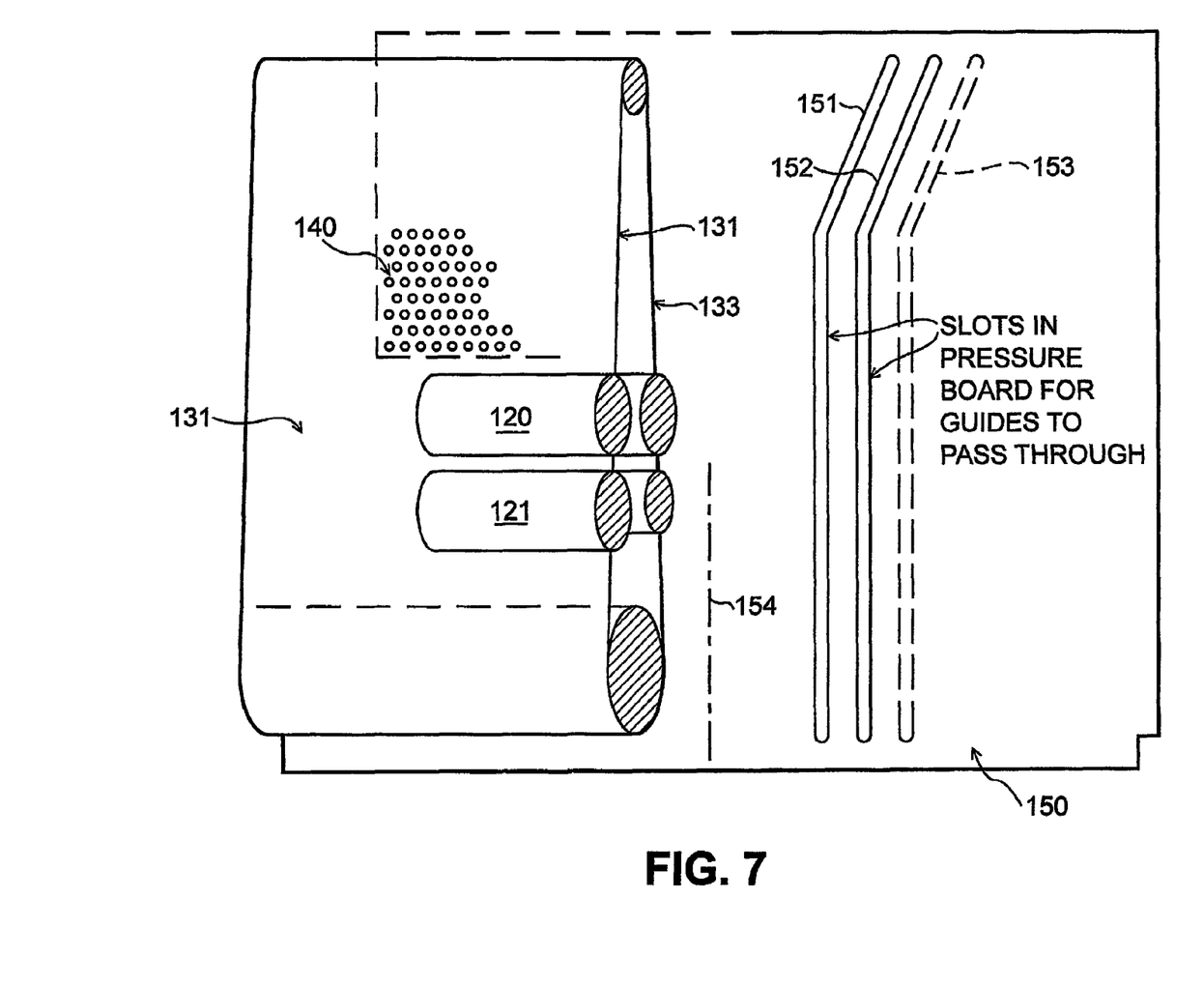
FIG. 7 is a front view, parts being omitted for clarity.

FIGS. 1 to 3 show schematic views of a prior art moulder where a divided dough piece 10 of preselected weight e.g., 2 lbs (900 grams), from a dough divider (not shown), is passed via an inlet mouth (not shown) between first and second pairs 20,21 of counter-rotating dough rollers to form a relatively thin dough strip 11 which engages the first run 31 of a belt dough conveyor 30, the first run 31 being spaced below a curling chain belt 40 and co-operating therewith to "curl" or "roll" the dough strip 11 as illustrated in FIG. 3. The "curled" dough piece 12 passes around the tail roller 32 of the dough conveyor 30 and is then rolled between the second run 33 of the dough conveyor 30 and a pressure rolling board 50 which is adjustable to enable the gap between the second run 33 of the conveyor belt and the pressure rolling board 50 to be adjusted.

Referring to FIGS. 4 to 7, the moulder 100 of the present invention has dough rollers 120,121, dough conveyor 130, and curling chain belt 140 substantially as hereinbefore described. The pressure rolling board 150 is modified from the pressure rolling board 50 of the prior art in the manner to be hereinafter described.

The divided dough pieces 10 are fed to the dough rollers 120 via an inlet mouth 160 which has a limiting means in the form of a pair of side plates 161,162, selectively movable towards, or away from, each other, to limit the width of the dough strip 11 which is fed to the first run 131 of the dough conveyor 130.

The dough moulder 100 includes channel means in the form of slots 151, 152, 153 formed in the pressure rolling board 150 and dough guide plates 155, 156 which are locatable by way of insertion through the slots 151, 152, 153, to define a channel of a selected width. Pairs of slots 151,152,153 are provided at selected spacings on opposed sides of the centre line 154 of the pressure rolling board 150. When inserted through the slots 151, 152, 153, the dough guide plates 155, 156 form the channel in the gap between the second run 133 and the pressure rolling board 150 in a direction substantially parallel to the second run 133. For example, for three popular British bread sizes, the inner pair of slots 151 may be spaced 150 mm apart; the intermediate slots 152 may be spaced 220 mm apart; and the outer slots 153 may be spaced 300 mm apart. The slots 151, 152, 153 can be arranged to provide channels having a width in the range of 100 to 350 mm. These would enable e.g., "1 pound"; "bloomer" (Trade Mark); and "half loaf" loaves to be moulded. For long thin stick-type bakery products, all of the guides plates are retracted.

In an alternative form, the moulder 100 may include a pair of guide plates 155, 156 for each respective pair of slots 151, 152, 153.

The dough guide plates 155, 156 include leading portions 157 (see FIGS. 4 and 5) inclined relative to and in the same plane as the remainder of each guide plate such that the opposed leading portions 157 define a funnel for directing dough pieces 12 from the first run 131 into the channel. The leading portions 157 are sized and shaped to fit through the leading ends of the slots.

It will be appreciated that the size of the gap between the second run 133 and the pressure rolling board 150 controls the pressure exerted on a dough piece being rolled. The extent to which the dough guide plates 155, 156 extend through the slots 151, 152, 143 into the gap affects the size of the gap and the pressure on a dough piece 12. The dough guide plates 155, 156, therefore, extend between the pressure rolling board 150 and second run 133 by an amount that permits adjustment of the gap size such that the second run 133 co-operates with the pressure rolling board 150 to retain a desired pressure on a dough piece 12. Such adjustment, accordingly, contributes to producing dough pieces of a selected size and/or shape.

Adjustment of the gap is achieved by moving the pressure rolling board 150 relative to the second run 133. To avoid having the dough guide plates 155, 156 contact the second run 133 and thereby prevent further movement of the pressure rolling board 150 closer to the second run 133, the pressure rolling board 150 is moveable relative to the second run 133 independently of the insertion of the dough guide plates 155, 156 through the pressure rolling board 150. As an alternative, the width of each slot 151, 152, 153 may be selected to co-operate with a given cross-sectional shape of the dough guide plates 155, 156 such that the guide plates 155, 156 extend into the gap by an extent determined by the width of the slot 151, 152, 153 and cross-sectional shape of the guide plate 155, 156. For instance, the pairs of slots 151, 152, 153 may be provided with a relative width that diminishes with spacing away from the centre line of the pressure rolling board 150. The dough guide plates 150 may have a tapered cross-section that narrows toward the top. The dough guide plates 150 will, therefore, extend into the gap by a greater extent for wider slots 151, 152, 153, than for narrower slots 151, 152, 153.

To simplify operation of the moulder 100, linkage means 180 (e.g., incorporating mechanical links, belt cranks and the like) may interconnect operating handles 181 that move the dough guide plates 155, 156 with the side plates 161,162 so that the side plates 161,162 are moved inwardly, or outwardly, to respectively constrict or expand the inlet 155, 156 as the dough guide plates are adjusted to select a decreased or increased channel width. That is, the linkage means 180 enables concomitant adjustment of the length of dough pieces fed through the inlet in response to adjustment of the channel width.

In tests conducted on an experimental machine, it has been found that there has been little, if any, tendency for the dough pieces 12 to be forced or "extruded" into the slots 151,152,153; and any small "ridges" which may be formed on the outer surface of the final dough pieces 12 disappear when the dough pieces are "proved".

It will be readily apparent to the skilled addressee that the number and spacing of the pairs of slots, and corresponding dough guide plates; and the number of alternative spacings between the moving side plates 161,162 of the inlet mouth 160, can be varied to suit the range of loaves and bakery pieces for which the moulder is to mould the dough pieces.

Various changes and modifications may be made to the embodiments described and illustrated without departing from the present invention.

The invention claimed is:

1. A dough moulder of the type having at least one pair of inlet rollers; a dough conveyor operable to receive a strip of dough which has passed through the rollers, the conveyor having a first run operable to co-operate with a curling chain belt to curl or roll the dough strip into a dough piece and a second run operable with a pressure rolling board to mould the dough piece to a selected size and/or shape, wherein:
the dough moulder includes guide plates insertable through slots in the pressure rolling board into a gap between the second run and the pressure rolling board to define a channel for limiting the length of the moulded dough piece.

2. A dough moulder according to claim 1, wherein the guide plates are operable to define the channel with a selected width.

3. A dough moulder according to claim 1, wherein the slots are provided in respectively spaced pairs such that the guide plates define the channel with a selected width when inserted through a respective pair of spaced slots.

4. A dough moulder according to claim 1, wherein said slots are provided in corresponding pairs, each slot of a respective pair is arranged at a selected spacing from a centerline of the pressure rolling board such that, when said guide plates are inserted through a pair of slots, said channel is centered on said centerline.

5. A dough moulder according to claim 1, wherein said guide plates, located in situ in the gap, define a channel that extends substantially parallel to the second run of the conveyor.

6. A dough moulder according to claim 1, wherein said guide plates have leading portions which direct the dough piece into the defined channel.

7. A dough moulder according to claim 6, wherein said leading portions are convergent with respect to each other to direct a dough piece from the first run into the channel.

8. A dough moulder according to claim 7, wherein said pressure rolling board has two or more pairs of slots.

9. A dough moulder according to claim 6 or 7, wherein said moulder includes one or more pairs of guide plates for insertion through said slots.

10. A dough moulder according to claim 6 or 7, wherein said moulder includes one pair of guide plates for each pair of slots.

11. A dough moulder according to claim 1, wherein said guide plates extend between the pressure rolling board and said second run by an extent that permits adjustment of the gap such that the second run co-operates with the pressure rolling board to mould the dough piece to a selected size and/or shape.

12. A dough moulder according to claim 11, wherein the pressure rolling board is moveable relative to the guide plates defining a channel whereby to adjust said gap and adjust extension of said guide plates between the pressure rolling board and the second run.

13. A dough moulder according to claim 1, wherein the pressure rolling board has a non-stick coating to facilitate movement of dough pieces through said channel.

14. A dough moulder according to claim 1, wherein the inlet rollers are fed dough pieces from an inlet, said inlet including limiting means to selectively control the width of a dough piece fed to the inlet rollers.

15. A dough moulder according to claim 14, wherein the limiting means includes side plates moveable relative to each other to constrict or expand an opening through which the dough pieces pass for feeding to the inlet rollers, such that dough pieces that pass through the relatively constricted aperture have a length greater than the length of the dough pieces that pass through the expanded aperture.

16. A dough moulder according to claim 14, wherein a linkage means interconnects the channel means to the limiting means such that selective width adjustment of the channel also adjusts the limiting means to feed dough pieces concomitantly adjusted in length.

17. A dough moulder according to claim 1, including a channel means operable to selectively adjust the channel to a width falling substantially in the range from 100 to 350 mm.

18. A dough moulder according to claim 1, including a channel means operable to selectively adjust the channel to a width falling substantially in the range from 150 to 300 mm.

* * * * *